(12) United States Patent
Michel et al.

(10) Patent No.: US 7,788,677 B1
(45) Date of Patent: Aug. 31, 2010

(54) METHODS AND APPARATUS PROVIDING A CATEGORICAL APPROACH TO STRONGLY TYPED COMPONENT MANAGEMENT

(75) Inventors: Ruben Michel, Hopkinton, MA (US); Stanislav Sosnovsky, Upton, MA (US); Richard Francis Cormier, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 1237 days.

(21) Appl. No.: 11/325,172

(22) Filed: Jan. 4, 2006

(51) Int. Cl.
*G06F 9/44* (2006.01)
*G06F 9/45* (2006.01)
(52) U.S. Cl. .................. 719/316; 719/328; 717/108
(58) Field of Classification Search ......... 707/103–104, 707/108; 717/114, 137; 719/315–328
See application file for complete search history.

(56) References Cited

U.S. PATENT DOCUMENTS 5,845,119 A * 12/1998 Kozuka et al. .............. 717/107
2003/0093551 A1 * 5/2003 Taylor et al. ............... 709/237
2005/0015775 A1 * 1/2005 Russell et al. .............. 719/315

* cited by examiner

*Primary Examiner*—Andy Ho
*Assistant Examiner*—Shih-Wei Kraft
(74) *Attorney, Agent, or Firm*—Chapin IP Law, LLC

(57) ABSTRACT

A code generator generates component controllers by receiving, as input, an identity of a component and identities of dependent components of the component and applying a categorical-based generator that applies at least one morphism to generate at least one component controller to manage both collocated and remote access to the dependent components of the component in a strongly typed manner. Application of the categorical based generator includes generating at least one service-component controller for controlling service components that, during operation, are instantiated upon component server initialization to provide services to other components during component server operation and generating at least one session-component controller for controlling session components instantiated, utilized for services during a session, and terminated as needed by other components.

16 Claims, 5 Drawing Sheets

METHODS AND APPARATUS PROVIDING A CATEGORICAL APPROACH TO STRONGLY TYPED COMPONENT MANAGEMENT

BACKGROUND

Computer software applications are often distributed between computer systems and require ability to access and exchange information with other remotely operating software applications. Such exchanges of data and access to functionality often take place over a computer network such as a local area network or a wide area network such as the Internet. Due to the complexities and varying mechanisms of implementing functionality and data formats within modern software applications, software developers often employ software commonly referred to as "middleware" that provides a standardized mechanism for the exchange of information and access to functionality between two or more remotely operating software programs. Middleware is generally connectivity software that consists of a set of enabling services that allow multiple processes running on one or more machines to interact across a network.

Middleware allows a software developer to create a software application using calls to a middleware-specific application programming interface or API in order to insulate the software developer from having to know the details of how to access the remotely operating software application and associated remote data structures or objects. By incorporating a set of middleware-specific function calls into the application under development, the software developer relies on the middleware transport and data access mechanisms and does not need to be concerned with details such as creation of connections to remote computer systems. Middleware is thus software that connects otherwise separate applications or separate products and serves as the glue between the applications. Middleware is thus distinct from import and export features that may be built into one of the applications. Developers often refer to middleware "plumbing" because it connects two sides of an application and passes data between them. For example, there are a number of middleware products that link a database system to a web server. This allows a user application to request data from the database using forms displayed on a web browser, and it enables the web server to return dynamic web pages based on the user application's requests.

One example of commonly used middleware architecture is called CORBA. CORBA is an acronym for Common Object Request Broker Architecture. The CORBA environment is an industry standard that is maintain by Object Management Group, Inc. (OMG) of Needham, Mass., USA. As described on OMG's web site, CORBA provides a vendor-independent architecture and infrastructure that computer applications use to work together over data networks. Using standardized protocols, a CORBA-based program from any vendor, on almost any computer, operating system, programming language, and network, can interoperate with a CORBA-based program from the same or another vendor, on almost any other computer, operating system, programming language, and network.

Conventional CORBA applications are composed of objects that are individual units of running software that combine functionality and data. Typically, there are many instances of an object of a single type. For example, an e-commerce website would have many shopping cart object instances, all identical in functionality but differing in that each is assigned to a different customer (i.e., client browser), and each contains data representing the merchandise that its particular customer has selected. For other object types, there may be only one instance. As an example, when a legacy application, such as an accounting system, is wrapped in code with CORBA interfaces and opened up to clients on a network, there is usually only one instance.

For each object type, such as the shopping cart mentioned above, a developer using middleware such as CORBA defines an interface in an OMG Interface Description Language (IDL). The interface is a syntax part of a contract that a server object offers to client programs that invoke functionality and access data within that server object. Any client that wants to invoke an operation on the object must use this IDL interface specification (i.e., object specification) to specify the operation it wants to perform, and to marshal arguments (i.e., parameters or data) that the client sends and receives from the server for access to that object. When the invocation reaches the target object, the same interface definition is used there to unmarshal the arguments so that the object can perform the requested data processing operation with the arguments. The interface definition is then used to marshal the results for their trip back to the client, and to unmarshal them when they reach the client destination.

A conventional IDL interface definition is independent of a selected programming language, but maps to all of the popular programming languages via industry standards. As an example, there are standardized mappings from IDL to C, C++, Java, COBOL and other languages.

The use of a middleware-specific interface, such as a CORBA call, that is separate from the middleware implementation, enabled by the IDL, is one essence of middleware such as CORBA and explains how conventional middleware enables interoperability between applications with all of the above noted transparencies. The interface to each object using a conventional middleware platform is defined very strictly. However, CORBA and other middleware platforms hide the implementation of an object (i.e., its running code and its data) from the rest of the system (that is, middleware encapsulates the implementation) behind a boundary that the client application may not cross. Clients access objects only through their advertised CORBA (or other middleware-specific) interface, invoking only those CORBA (or other middleware) operations that the object exposes through its IDL interface, with only those CORBA (or other middleware) parameters (input and output) that are included in the invocation.

FIG. 1 is a prior art illustration of an invocation 90 by a single client process 80 for access to an object implementation 82 using middleware such as CORBA including an IDL stub 84, an object request broker 86, and an IDL skeleton 88. While the instant example uses CORBA as the middleware platform, the example applies to other conventional middleware platforms as well.

Prior to execution, a developer 70 using an IDL compiler 72 compiles an object model specification 74 defined in IDL into client IDL stubs 84 and object skeletons 88, and writes the code for the client 80 and for the object implementation 82. The stubs 84 and skeletons 88 serve as proxies for clients 80 and object 82 (e.g., server), respectively. Because IDL defines interfaces so strictly, the stub 84 on the client side has no trouble meshing perfectly with the skeleton 88 on the server side, even if the two are compiled into different programming languages. If CORBA is the middleware that provides the object request broker (ORB) 86, the CORBA ORB 86 can even be produced from different vendors so long as it conforms to the CORBA standard.

In CORBA, every object instance 82 has its own object reference in the form of an identifying electronic token or string. Clients 80 use the object references to direct their invocations 90, identifying to the ORB 86 the exact instance of an object 82 that the client 80 wants to invoke. Using the shopping cart example, this ensures that the shopping cart object 82 for one client 80 is different from a shopping cart object of another client. The client 80 acts as if it is invoking an operation on the object instance 82, but the client 80 is actually invoking a call on the IDL stub 84 that acts as a proxy to the object 82. Passing through the stub 84 on the client side, the invocation 90 continues through the ORB 86, and the skeleton 88 on the implementation side, to get to the object implementation 82 where it is executed. FIG. 1 thus shows invocation through a single machine.

FIG. 2 diagrams a remote invocation 92 that occurs over a network 94. In order to invoke the remote object instance, the client 80 first obtains its object reference using a naming or trading service. To make the remote invocation 92, the client 80 uses the same code used in the local invocation described in FIG. 1, but substitutes the object reference for the remote object instance. When the local ORB 86 examines the object reference and discovers that the target object is a remote object, the local ORB 86 routes the invocation 92 out over a network 94 to the remote object's ORB 96.

To identify the correct object, the client 80 knows the type of object that it is invoking (e.g., that it's a shopping cart object), and the client stub 84 and object skeleton 88 are generated from the same IDL object model specification 74. This means that the client 80 knows exactly which operations it may invoke, what the input parameters are, and where they have to go in the invocation. Accordingly, when the invocation 92 reaches the target object, all parameters are present. Additionally, the local client's 80 ORB 86 and the remote object's ORB 96 operate on a common protocol that provides a representation to specify the identity of the target object, its operation, and all parameters (input and output) of every type that they may use. Accordingly, although the local ORB 86 can tell from the object reference that the target object is a remote object, the client 80 does not know the physical operating location of the target object. There is nothing in the object reference token obtained by the client 80 that the client holds and uses at invocation time that identifies the location of the target object. The token is opaque to the client. This ensures location transparency in order to simplify the design of distributed object computing applications.

Another example of middleware development environments are COM (Common Object Model) and DCOM (Distributed COM) developed by Microsoft Corporation of Redmond, Wash., USA. COM refers to both a specification and implementation developed by Microsoft Corporation which provides a framework for integrating components. This framework supports interoperability and reusability of distributed objects by allowing developers to build systems by assembling reusable components from different vendors which communicate via COM in a manner similar to that of the CORBA example provided above. By applying conventional COM to build systems of preexisting components, developers attempt to reap benefits of maintainability and adaptability. COM defines an application programming interface (API) to allow for the creation of components for use in integrating custom applications or to allow diverse components to interact.

However, in order to interact, COM components must adhere to a binary structure specified by Microsoft Corporation. As long as COM components adhere to this binary structure, components written in different languages can interoperate using COM on the Windows platform only. Distributed COM is an extension to COM that allows network-based component interaction. While COM processes can run on the same machine but in different address spaces, the DCOM extension allows processes to be spread across a network. With DCOM, components operating on a variety of other platforms can interact, as long as DCOM is available on those other platforms.

Another technology related to middleware and the use of object-oriented programming is referred to as a bridge design pattern. A bridge design pattern bridges two object models, typically an abstraction and its implementation. The bridge design pattern is described more fully in a book entitled "Design Patterns—Elements of Reusable Object-Oriented Software" authored by Erich Gamma, Richard Helm, Ralph Johnson, and John Vlissides (ISBN 0-201-63361-2), published by Addison Wesley Publishing Company, 2000. The entire teachings and contents of this reference are hereby incorporated by reference in their entirety.

SUMMARY

Conventional mechanisms and techniques used for developing software applications that rely on middleware environments suffer from a variety of deficiencies. In particular, when a software developer produces an object model specification using an interface description language (IDL) and compiles this object model specification using a conventional middleware compiler such as a conventional CORBA IDL compiler, the conventional stubs 84 (FIG. 1) and skeletons 88 (FIG. 1) and any functionality exposed through the CORBA stubs or skeletons requires sophisticated knowledge of the IDL and its specific language mappings (to Java, C++, etc). Application programmers responsible for developing client 80 application code, who often lack this knowledge of middleware specific information, are often slowed down in their development efforts by the middleware-specific information produced within the generated IDL stubs 84 and IDL skeletons 88. Programmers can thus become significantly more productive if they program using CORBA-independent stubs and skeletons.

As a specific example, a CORBA interface typically consists of many IDL "types" including the interface itself, one or more super interfaces, enums, exceptions, sequences, structs, valuetypes, methods with parameters and return types, and so forth. When presented with an IDL interface object model specification 74, a conventional IDL-to-Java compiler emits the conventional IDL object model (stubs 84 and skeletons 88 in FIG. 1 above), which are realized by a plethora of Java classes and Java interfaces, each conforming to the IDL-to-Java mapping. While this object model is ORB-vendor independent, unfortunately, the conventionally emitted files are cluttered with middleware-specific (i.e., CORBA) information, such as CORBA markers, interface-repository information, references to the CORBA ORB and its methods, methods invoked by the CORBA ORB, marshalling functionality, and the like. Such middleware-specific information is often distracting and confusing to application development programmers unfamiliar with CORBA. As a result, the programmers who must utilize the stubs and skeletons must become familiar to some extent with middleware-specific information presented within the interface stubs 84 and skeletons 88. The programmers are thus less efficient. The programmers can become significantly more productive if they program using CORBA-independent stubs and skeletons, but conventional middleware development platforms do not provide such capability.

Additionally, in the event that an owner of software desires to change the middleware system, for example, from CORBA to a middleware system such as COM, the application software that relies on the middleware system must be revised so that the middleware-specific references utilized within the IDL stubs and skeletons comply with the new selected middleware environments. Accordingly, initial selection of a conventional middleware environment can become an important decision when creating software using conventional middleware development techniques due to the future difficulty of switching to a different middleware platform after the software has been developed using a chosen middleware platform. As new middleware platforms enter the marketplace and/or as existing platforms are equipped with more features (or client application requirements change), dependence upon a specific middleware platform can become problematic.

One solution to this problem is described in detail in patent application entitled "METHODS AND APPARATUS FOR CREATING MIDDLEWARE INDEPENDENT SOFTWARE" filed Mar. 31, 2005, having U.S. Ser. No. 11/095,406 (U.S. Pat. No. 7,546,309), sharing co-inventorship herewith, and assigned to the same assignee as the present invention. Another solution to this problem for valuetypes is described in detail in patent application entitled "METHODS AND APPARATUS PROVIDING A CATEGORICAL APPROACH TO VALUETYPE BRIDGE SUPPORT" filed Jan. 3, 2006, having U.S. Ser. No. 11/324,843 (U.S. Pat. No. 7,596,572), sharing co-inventorship herewith, and assigned to the same assignee as the present invention. The entire teachings and contents of these referenced patent applications are hereby incorporated by reference in their entirety. The solution described in the above-referenced patent applications apply for many different IDL types, such as interface, enum, struct, exception, valuetypes, and sequence used within object oriented programming languages such as Java.

Technology related to producing or generating code using a categorical approach is described in patent application entitled "SYSTEM AND METHODS FOR GENERATING A SOFTWARE COMPONENT INTERFACE" filed Jun. 24, 2005, having U.S. Ser. No. 11/166,934 (U.S. Pat. No. 7,673,285), sharing co-inventorship herewith, and assigned to the same assignee as the present invention. The entire teachings and contents of this referenced patent application are hereby incorporated by reference in their entirety.

Other problems also arise when trying to insulate application developers from details of middleware-specific issues. In particular, managing the interaction among components is subtle and complex. Following other component frameworks, the framework disclosed herein supports two types of components: session components, which are stateful and whose lifecycle is managed by their creating clients, and service components, which do not necessarily retain state between invocations, and whose lifecycles are typically decoupled from most or all of their clients.

Typically, components expose their high-level functionality through crisply defined remotable interfaces. In the component framework disclosed herein, the remotable interfaces are declared in IDL to allow interoperability with other languages and platforms. Each synchronous interface invocation may cause many complex activities in the component before the client regains control. In such cases, the network roundtrip may incur a negligible overhead. Other use cases, however, require numerous, very brief interface invocations, where the network roundtrip may be substantial. As an example, consider paging through tens of thousands of devices in a large capacity disk array. This is the network overhead problem.

Additionally, components often exhibit a compact and cohesive set of interfaces. Some components, however, exhibit rich and complex functionality that is arduous to translate into IDL. Consider, for example, a database-access technology such as TopLink manufactured by Oracle (Oracle TopLink is a Java object-to-relational persistence architecture manufactured by Oracle Corporation of Red Shores, Calif., USA) used in development of distributed software, which may be encapsulated in a single application programming interface component. TopLink is a complex product supporting numerous invocation patterns; exposing all these invocation patterns through IDL would be extremely laborious, making it impractical. This is the interface richness problem.

To overcome both problems, embodiments disclosed herein introduce the concept of component friendship: a component is a friend of another component if it can access the latter's coFriend interface using plain Java calls, rather than through the network.

To illustrate the concepts, consider observations involving the interaction among three components, displayed in FIG. 3. The service components TestComponentBook 600 and TestComponentPublisher 601 are instantiated upon component server initialization. TestComponentBook 600 relies on services provided by TestComponentPublisher 601. Throughout its execution, TestComponentBook 600 occasionally creates an instance of TestSessionComponentReader 602, utilizes TestSessionComponentReader 602 services during a session, and, finally, destroys the instance when its services are no longer required.

More specifically, embodiments disclosed herein are based in part on these observations and provide a system that provides for categorical generation of component controllers. Techniques and mechanisms disclosed herein operate by receiving, as input, an identity of a component and identities of dependent components of the component. From this, the system outputs controllers to manage both collocated and remote access to dependent components in a strongly typed manner. More specifically, the system operates by applying a categorical-based generator that applies at least one morphism to generate at least one component controller to manage both collocated and remote access to the dependent components of the component in a strongly typed manner. Application of the categorical based generator includes generating at least one service-component controller for controlling service components that, during operation, are instantiated upon component server initialization to provide services to other components during component server operation. Additionally, application of the categorical based generator includes generating at least one session-component controller for controlling session components instantiated, utilized for services during a session, and terminated as needed by other components.

Using CORBA as an example middleware platform, generation of an abstraction interface object model (i.e., an abstracted interface object model) that includes the above features conceals all the CORBA-related information, while preserving application functionality. Generation of the implementation of the abstraction interface object model produces a CORBA or other middleware implementation object model that implements the interfaces and abstract classes in the interface object model using CORBA, but that is hidden from the programmer developing an application. In this manner, a software developer can obtain the benefits of middleware such as CORBA without having to have knowledge of CORBA and without having interface calls cluttered with CORBA specific information.

Other embodiments include computerized devices, such computer systems, workstations or other devices configured or operable to process and perform all of the methods and processing operations disclosed herein as embodiments of the invention. In such embodiments, a computer system includes a memory system, a processor, a communications interface and optionally a display and an interconnection mechanism such as a bus, circuitry or a motherboard connecting these components. The memory system is encoded with a generator application (i.e. a categorical-based generator) that when performed on the processor, produces a generator process that operates as explained herein to perform all of the method embodiments and operations explained herein.

Other arrangements of embodiments of the invention that are disclosed herein include software programs to perform the method embodiment steps and operations summarized above and disclosed in detail below of the categorical-based generator. More particularly, a computer program product is disclosed that has a computer-readable medium including categorical-based generator computer program logic encoded thereon that when performed in a computerized device provides operations of the categorical-based generator application and categorical-based generator process as respectively explained herein. The computer program logic, when executed on at least one processor with a computing system, causes the processor to perform the operations (e.g., the methods) indicated herein as provided by the categorical-based generator. In addition, the abstracted and implementation object models explained herein when encoded on a computer readable medium represent embodiments of the invention as well. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software (source code and/or object code) or firmware or other such configurations can be installed onto a computerized device to cause one or more processors in the computerized device to perform the techniques explained herein as embodiments of the invention. Software processes that operate in a collection of computerized devices, such as in a group of storage area network management servers, hosts or other software development entities are also categorical-based generators when configured as explained herein. The system of the invention can be distributed between many software processes on several computers, or processes such as the categorical-based generator process can execute on a dedicated computer alone. The categorical-based generator (also generally referred to herein as simply the generator) may be integrated into a storage area network management application as well, or used in development of any type of distributed software.

It is to be understood that the system of the invention can be embodied strictly as a software program, as software and hardware, or as hardware alone. Example embodiments of the invention may be implemented within EMC Corporation's software application(s) that provide management functionality for storage area network resources and in computerized devices that operate, for example, ControlCenter software. ControlCenter is a trademark owned by EMC Corporation of Hopkinton, Mass., USA.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

Embodiments of the invention provide a system that provides for categorical generation of component controllers. Techniques and mechanisms disclosed herein operate by receiving, as input, an identity of a component and identities of dependent components of the component. From this, the system outputs (i.e., generates) controllers to manage both collocated and remote access to dependent components in a strongly typed manner. In particular, the system is able to receive an object model, specified for example in an Interface Description Language (IDL), and is able to generate an abstraction of that object model that preserves the application semantics expressed in the IDL, but that is middleware independent. In addition, the system explained herein generates an implementation of that abstraction for a particular middleware such as CORBA or another selected middleware platform.

Using CORBA as an example, one purpose of the abstracted interface object model is to conceal all the CORBA (i.e., middleware) related information, while preserving application functionality. One purpose of the CORBA-implementation object model is to implement the interfaces and abstract classes in the interface object model using CORBA. To do so, the system disclosed herein provides a categorical-based generator (also referred to herein as a generator). Through application of morphisms to the object model specification, the system conceals all middleware-related information, while preserving application functionality of an application that uses the object model specification.

Example discussions of embodiments disclosed herein use CORBA as a middleware platform for ease of discussion of processing. However, it is to be understood that the system disclosed herein is not limited to CORBA and that other implementation object models could also be emitted, based on various middleware technologies such as RMI, Tibco, or COM. Furthermore, a no-middleware object model could be emitted for a configuration that uses collocation.

It is also to be understood that the invention is not limited to receiving an object model specification in IDL. IDL is used in the examples herein since it is language and platform neutral. In other words, IDL was chosen because it is platform- and language-neutral, not due to its CORBA origins.

Figure 4:
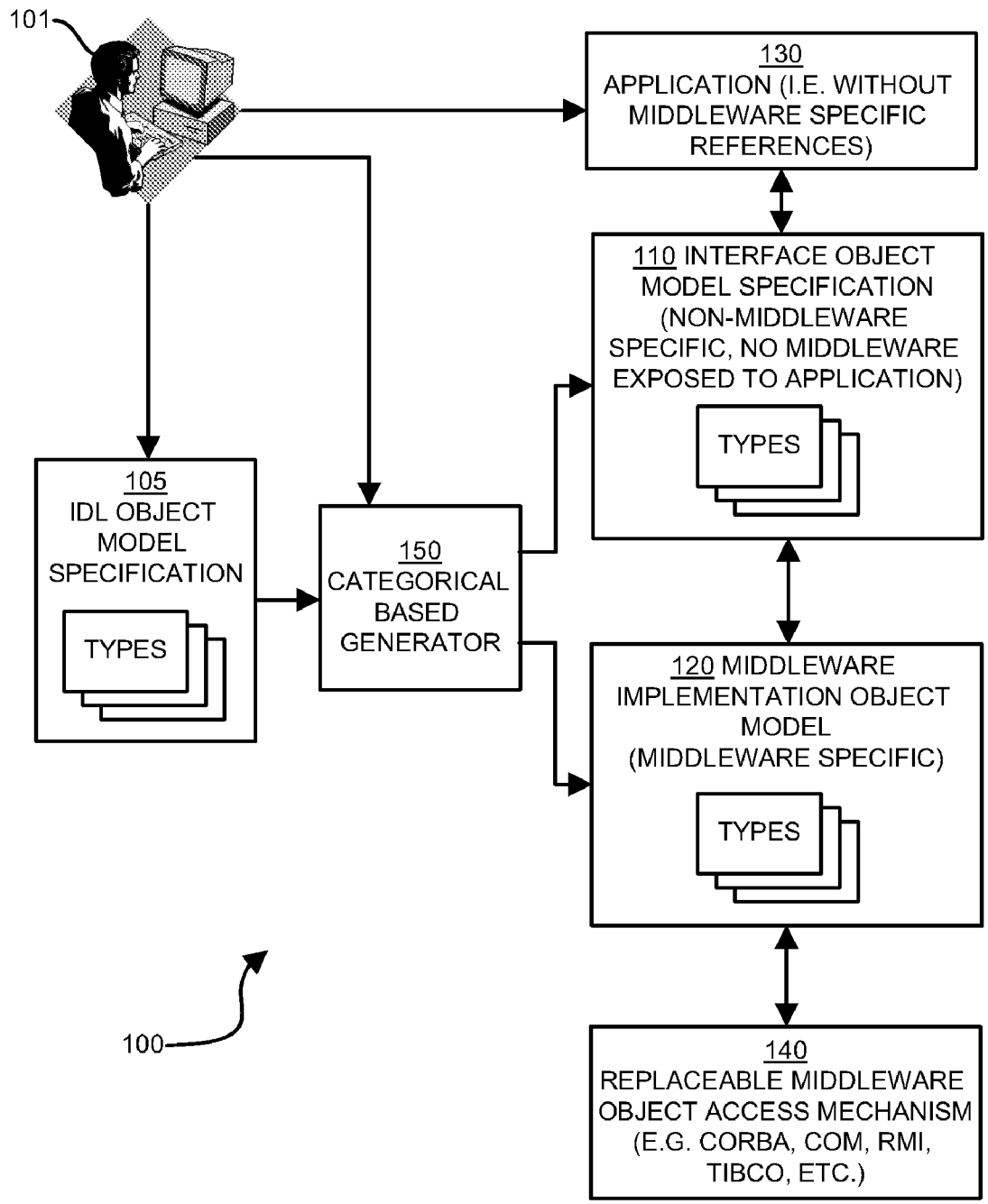
FIG. 4 illustrates an example software generation environment that operates according to embodiments disclosed herein.

FIG. 4 illustrates an application development environment 100 suitable for use in explaining example embodiments of the system disclosed herein. The system disclosed herein allows a developer 101 to provide an IDL object model 105 as input to a categorical-based generator 150 configured in accordance with embodiments of the invention. A categorical-based generator 150 examines each type defined in the IDL object model 105 and produces, as output, an abstraction interface object model 110 that is an abstraction of the IDL object model specification 105 that can be utilized by the developer 101 when creating the application 130, but that hides any middleware related information. Additionally, the categorical-based generator 150 (hereinafter the generator 150) produces an implementation 120 of the abstraction interface object model for a particular middleware object access mechanism 140 used to access data within objects corresponding to the object model specification 105. These generated items are provided so that programmers of the application 130 do not need to be intimately familiar with middleware specific issues related to passage of such context as explained herein.

Figure 5:
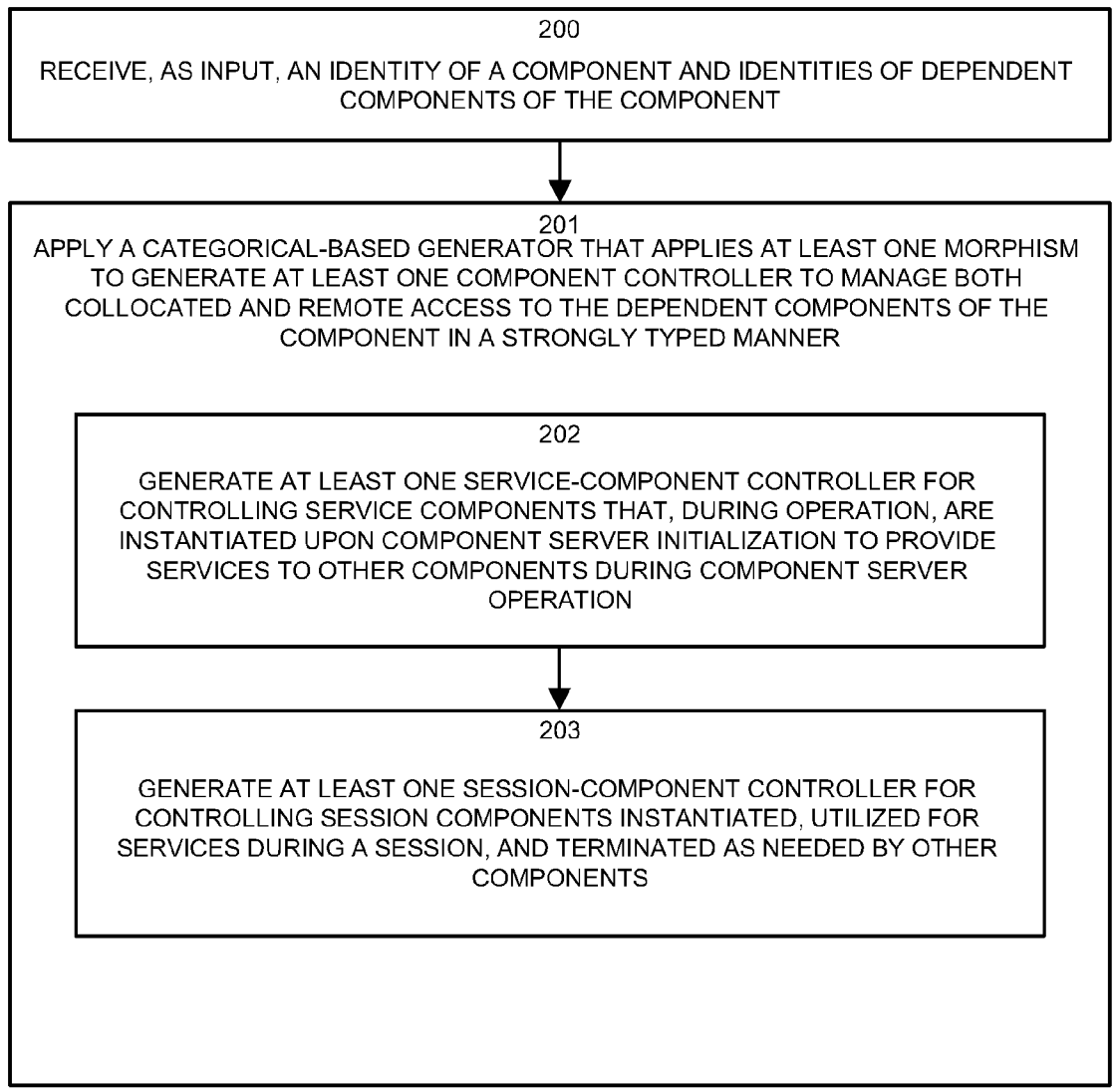
FIG. 5 is a flow chart of processing steps performed by a categorical-based generator as disclosed herein.

FIG. 5 is a flow chart of processing steps performed by a categorical-based generator 150 (i.e. a generator according to embodiments disclosed herein) that produces a system capable of generating code for component controllers.

In step 200, the categorical-based generator 150 receives, as input, an identity of a component and identities of dependent components of the component (e.g., from a component descriptor).

In step 201, the categorical-based generator 150 applies at least one morphism to generate at least one component controller to manage both collocated and remote access to the dependent components of the component in a strongly typed manner. Application of the categorical based generator including step 202 and 203.

In step 202, the categorical-based generator 150 generates at least one service-component controller for controlling service components that, during operation, are instantiated upon component server initialization to provide services to other components during component server operation.

In step 203, the categorical-based generator 150 generates at least one session-component controller for controlling session components instantiated, utilized for services during a session, and terminated as needed by other components.

Further details of this processing will now be demonstrated with respect to code examples that illustrate further configurations and enabling aspects of the invention.

As noted above, managing the interaction among components is subtle and complex. Following other component frameworks, the framework described here supports two types of components: session components, which are stateful and whose lifecycle is managed by their creating clients, and service components, which do not necessarily retain state between invocations, and whose lifecycles are typically decoupled from most or all of their clients.

Typically, components expose their high-level functionality through crisply defined remotable interfaces. In the component framework disclosed herein, the remotable interfaces are declared in IDL to allow interoperability with other languages and platforms. Each synchronous interface invocation may cause many complex activities in the component before the client regains control. In such cases, the network roundtrip may incur a negligible overhead. Other use cases, however, require numerous, very brief interface invocations, where the network roundtrip may be substantial. As an example, consider paging through tens of thousands of devices in a defined in a large capacity disk array. This is the network overhead problem.

Additionally, components often exhibit a compact and cohesive set of interfaces. Some components, however, exhibit rich and complex functionality that is arduous to translate into IDL. Consider, for example, a database-access technology such as TopLink manufactured by Oracle (Oracle TopLink is a Java object-to-relational persistence architecture manufactured by Oracle Corporation of Red Shores, Calif., USA) used in development of distributed software, which may be encapsulated in a single application programming interface component. TopLink is a complex product supporting numerous invocation patterns; exposing all these invocation patterns through IDL would be extremely laborious, making it impractical. This is the interface richness problem.

To overcome both problems, embodiments disclosed herein introduce the concept of component friendship: a component is a friend of another component if it can access the latter's coFriend interface using plain Java calls, rather than through the network.

Figure 1:
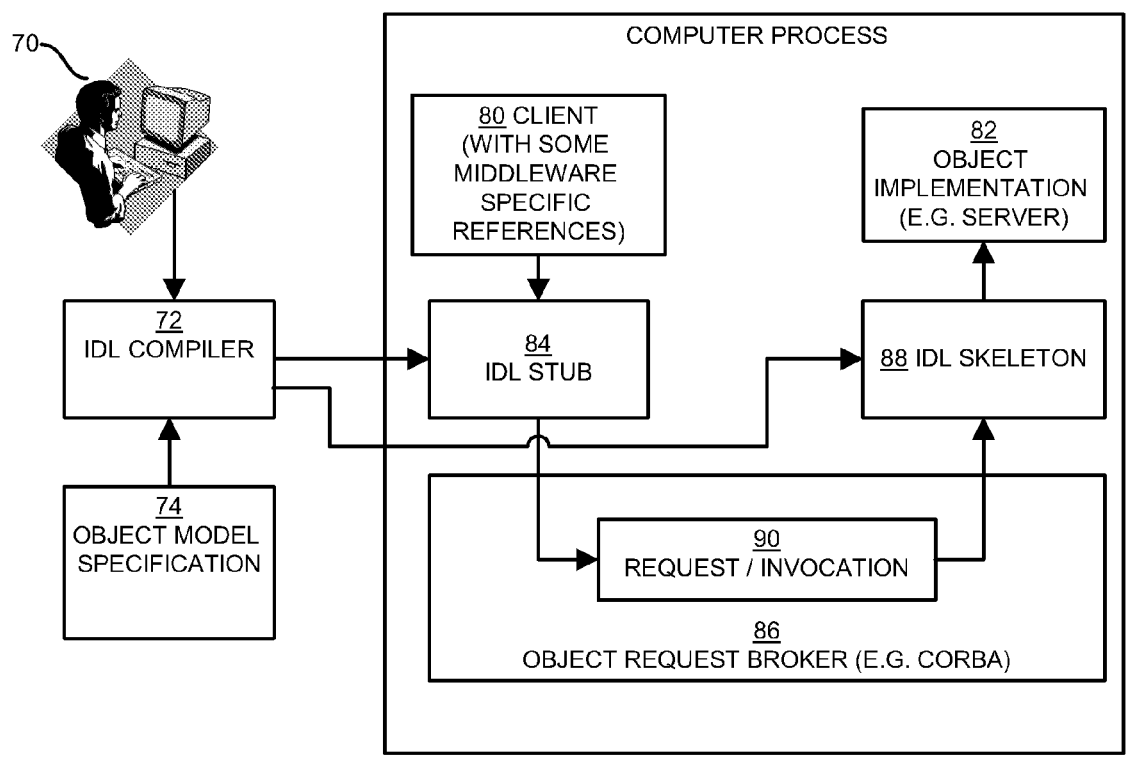
FIGS. 1 and 2 are prior art illustrations of operations of conventional middleware.
Figure 2:
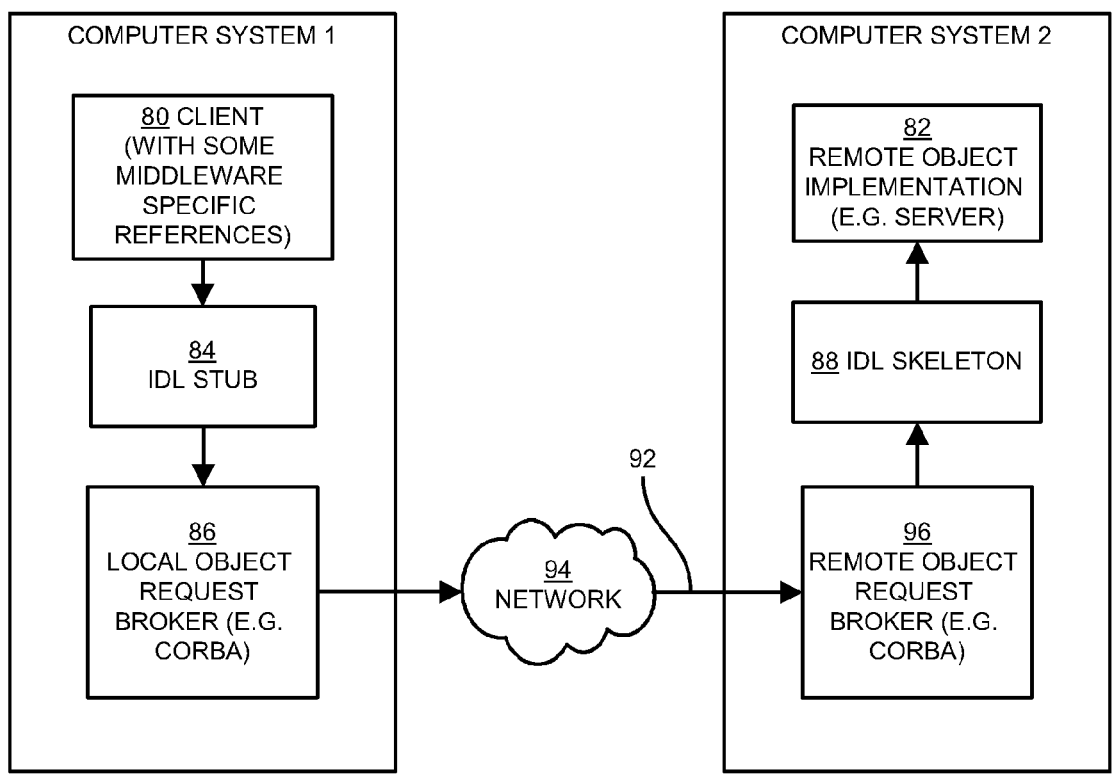
Figure 3:
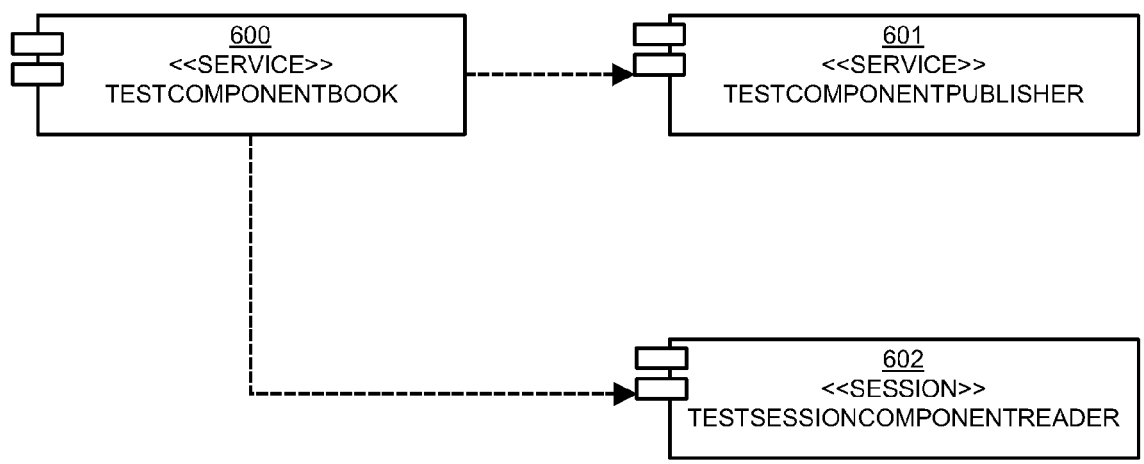
FIG. 3 shows relationships between session and service components.

Referring again to the example in FIG. 3, the service components TestComponentBook 600 and TestComponentPublisher 601 are instantiated upon component server initialization. TestComponentBook 600 relies on services provided by TestComponentPublisher 601. Throughout its execution, TestComponentBook 600 occasionally creates an instance of TestSessionComponentReader 602, utilizes TestSessionComponentReader 602 services during a session, and, finally, destroys the instance when its services are no longer required.

To manage its interaction with its dependent components, TestComponentBook 600 uses generated component controllers as described below. The controllers are used in TestComponentBook's coClass, and are created by the following factories declared in the coFactories interface:

```
package com.emc.eccapi.bridge.TestComponentBook;
/*
* Generated coFactories interface for component
*                  com.emc.eccapi.TestComponent-
   Book.TestComponentBook.
*/
public interface ITestComponentBookCoFactories
{
...
com.emc.eccapi.bridge.TestSessionComponentReader.
   ITestSessionComponentReader-
Controller_createSessionController_Te
   stSessionComponentReader_Test-
SessionComponentReader( )
   throws
   com.emc.eccapi.framework.ComponentNotFound,
com.emc.eccapi.framewo
   rk.
   ComponentActivationDisabled;
   com.emc.eccapi.bridge.TestComponentPublisher.
   ITestComponentPublisherCon-
troller_createServiceController_TestCo
   mponentPublisher_TestComponentPublisher( )
   throws       com.emc.eccapi.framework.Compo
      nentNotFound;
...
}
```

Example 1 (Above)

Exposing Controller Factories in the Generated Cofactories Interface

Although syntactically similar, the semantics of the two factories are very different, as demonstrated by the following code snippet of TestComponentBook's coBridge.

```
package com.emc.eccapi.bridge.TestComponentBook;
/*
* Generated coBridge for component
*                  com.emc.eccapi.TestComponent-
   Book.TestComponentBook.
*/
public abstract class TestComponentBookCoBridge
   extends com.emc.eccapi.TestComponentBook.
```

```
TestComponentBookCoClass
{
...
public
com.emc.eccapi.bridge.TestSessionComponentReader.
ITestSessionComponentReaderController
_createSessionController_Test-
SessionComponentReader_TestSessionC
   omponentReader( )
   throws com.emc.eccapi.framework.ComponentNotFound
,              com.emc.eccapi.framework.Compo-
      nentActivationDisabled
   {
      com.emc.eccapi.server.SessionCom-
         ponentFactory.RTO rto=
         com.emc.eccapi.server.SessionComponentFactory.
            create_rto("TestSessionComponentReader",
               "1.0");
      return    new    com.emc.eccapi.bridge.TestSes-
         sionComponentReader.
         TestSessionComponentReaderControllerImpl_(
            rto.getSessionLookup( )
   , rto.getComponent( ))
      );
   }
   public
com.emc.eccapi.bridge.TestComponentPublisher.
ITestComponentPublisherController
_createServiceController_Test-
ComponentPublisher_TestComponentPub
   lisher( )
   throws com.emc.eccapi.framework.ComponentNotFound
   {
      com.emc.eccapi.server.NamingService.
         ServiceComponentCoFriendInfo info=
         com.emc.eccapi.server.NamingService.
            getServiceComponentCoFriendInfo ("TestCompo-
               nentPublisher"
            , "1.0"
         );
      return    new    com.emc.eccapi.bridge.TestCompo-
            nentPublisher.
   TestComponentPublisherControllerImpl_(info.get-
Lookup( )
   , info.getComponent( )
      );
   }
...
}
```

Example 2 (Above)

Implementing Controller Factories in the Generated Cobridge Class

To create a session-component controller, the controller factory delegates to the component server's SessionComponentFactory, which generates a new instance of the required version of the session component. The SessionComponentFactory returns an arbitrary remotable interface of the newly created component (if such an interface exists) and the component's coFriend; both are used to generate the session-component controller.

In contrast, the controller factory for service components does not create service components. Instead, the controller factory queries the naming service for a service component of the proper name and version. The naming service retrieves an arbitrary remotable interface of the service component (if such an interface exists) and the component's coFriend; both are again used to generate the service-component controller.

A component controller, for either a session or a service component, serves two significant purposes: to expose the invoked component's coFriend in a strongly typed manner and to expose all the component's remotable interfaces in a strongly typed manner.

To illustrate a component controller, consider TestSessionComponentReader, which for simplicity exposes a single interface also called TestSessionComponentReader. The component's IDL is given in code example 3 below:

```
#ifndef     COM_EMC_ECCAPI_TEST_SessionCom-
ponentReader_IDL
#define     COM_EMC_ECCAPI_TEST_SessionCom-
ponentReader_IDL
#include "SessionLookup.idl"
module com {
module emc {
module eccapi {
module reader {
interface TestSessionComponentReader: framework::SessionLookup
   {
   void setReader(in string reader);
   string getReader( )
};
};};};
#endif  //  COM_EMC_ECCAPI_TEST_SessionCom-
ponentReader_IDL
```

Example 3 (Above)

The Remotable Interface of TestSessionComponentReader

The implementation of the controller is displayed in code example 4 below:

```
package        com.emc.eccapi.bridge.TestSes-
sionComponentReader;
/
* Generated session-component controller class for com-
   ponent
*
* com.emc.eccapi.TestSessionComponentReader.
* TestSessionComponentReader.
*/
public    class     TestSessionComponentReader-
ControllerImpl_ implements
   com.emc.eccapi.bridge.TestSes-
sionComponentReader.ITestSessionComp
   onentReaderController
   {
   public
TestSessionComponentReaderControllerImpl_(
   com.emc.eccapi.framework.
   SessionLookup sessionLookup
   , com.emc.eccapi.framework.
      IComponent component)
         )
{
   this.sessionLookup=
      com.emc.eccapi.bridge.framework-
         .SessionLookupImpl_.
      hInv(sessionLookup);
   this.coFriend=
      (com.emc.eccapi.TestSessionComponentReader.
```

```
      ITestSessionComponentReaderCoFriend)  compo-
         nent;
}
public
com.emc.eccapi.TestSessionComponentReader.
   ITestSessionComponentReaderCoFriend
   getCoFriend( )
{
   return this.coFriend;
}
public
com.emc.eccapi.bridge.reader.
   ITestSessionComponentReader
   get_reader_TestSessionComponentReader( )
   throws com.emc.eccapi.framework.InterfaceNotFound
{
   try
   {
      return com.emc.eccapi.bridge.reader.
         TestSessionComponentReaderImpl_.downcast(
         this.sessionLookup.
           getInterface("TestSessionComponentReader")
              );
   }
   catch(com.emc.eccapi.bridge.framework-
         .LookupPackage.
         InterfaceNotFound e
      )
   {
      throw   new   com.emc.eccapi.framework.Inter-
         faceNotFound(
            "Failed to locate interface"+
               "com.emc.eccapi.reader.TestSes-
                  sionComponentReader."
            , e)
               );
   }
}
private com.emc.eccapi.bridge.framework.
   ISessionLookup sessionLookup;
private com.emc.eccapi.TestSessionComponentReader.
   ITestSessionComponentReaderCoFriend coFriend;
}
```

Example 4 (Above)

Implementing Controller Factories in the Generated Cobridge Class

The constructor receives a reference to the component's instance, which it casts to the coFriend interface before storing it as a member. The getCoFriend( ) method returns this strongly typed coFriend upon invocation.

The constructor also receives one of the component's CORBA interfaces, which it wraps in a member bridge interface (in the CORBA-implementation object model) by applying the SessionLookup inverse morphism. Next, for every remotable interface supported by the component, a single interface in our case, the controller features a strongly typed getter for that interface, get_reader_TestSessionComponentReader( ). That getter returns an instance of the bridge interface ITestSessionComponentReader (in the interface object model). This is accomplished by first applying the method getInterface( ) on the sessionLookup member to retrieve the requested interface. That retrieved interface, of type Lookup, is then downcast to obtain the required instance of the TestSessionComponentReader bridge interface.

Consequently, strong typing is achieved through code generation, and exposure in the interface object model is obtained by judiciously applying morphisms and inverse morphisms in the implementations of the downcast operator and the get Interface( ) method, as illustrated in code examples 5 and 6 below:

```
package com.emc.eccapi.bridge.reader;
/*
* Generated implementation for the IDL interface
* com.emc.eccapi.reader.TestSessionComponentReader.
*/
public class TestSessionComponentReaderImpl_
   implements
   com.emc.eccapi.bridge.reader.IT-
estSessionComponentReader
   , com.emc.eccapi.bridge.framework.ISessionLookup
{
   ...
   static public
   com.emc.eccapi.bridge.reader.IT-
      estSessionComponentReader
   downcast(com.emc.eccapi.framework.IBridgeInterface
      bridgeInterface)
   {
      if (bridgeInterface == null) return null;
      return
   com.emc.eccapi.bridge.reader.Test-
SessionComponentReaderImpl_.hInv
      (
      com.emc.eccapi.reader.TestSes-
sionComponentReaderHelper.narrow(bri
         dgeInterface._h( ))
         );
   }
   ...
}
```

Example 5 (Above)

The Downcast Operator

```
package com.emc.eccapi.bridge.reader;
/*
* Generated implementation for the IDL interface
* com.emc.eccapi.reader.TestSessionComponentReader.
*/
public class TestSessionComponentReaderImpl_
   implements
   com.emc.eccapi.bridge.reader.IT-
estSessionComponentReader.
   , com.emc.eccapi.bridge.framework.ISessionLookup
{
   ...
   public
   com.emc.eccapi.bridge.framework.ILookup
   getInterface(java.lang.String string__0)
   throws
   com.emc.eccapi.bridge.framework-
.LookupPackage.InterfaceNotFound
   {
      try
      {
         return     com.emc.eccapi.bridge.framework-
            .LookupImpl_.hInv(
         hh( )getInterface(string__0))
         );
      }
```

```
catch(com.emc.eccapi.framework.Lookup-
Package.InterfaceNotFound e)
{
    throw
com.emc.eccapi.bridge.framework-
.LookupPackage.InterfaceNotFoundIm
    pl_.hInv(e);
}
}
...
}
```

Example 6 (Above)

The getInterface( ) Method

Component controllers for service components are defined similarly, with the exception that they rely on the naming service rather than on the getInterface( ) method.

Contrary to Microsoft's Component Object Model (COM) that exposes the component's interfaces through the weakly typed method IUnknown::QueryInterface( ), component controllers provide strongly typed access to the component's interfaces. To illustrate the benefits of the strongly typed approach, if an interface is removed from a component, that interface will disappear from the generated component controller; a coClass that still attempts to access the removed interface through the controller will, therefore, fail to compile. Thus, the now faulty coClass will be exposed at compile time. In contrast, in COM the interface disappearance would be discovered only at run time, and only if an attempt is made to invoke on the removed interface.

Finally, an additional benefit of component controllers is transparent support of component versioning. Specifically, suppose that the service component TestComponentPublisher is upgraded from version 1.0 to version 1.1. Then, the naming service will transparently locate the upgraded version of the component whenever the previous version is requested. Since components can expose multiple interfaces, old interfaces can still be supported in the new version of the component, while new functionality can be exposed in newly added interfaces. Consequently, the upgraded version of TestComponentPublisher would satisfy the Liskov Substitution Principle (LSP).

The aforementioned example embodiments thus provide mechanisms to avoid a programmer from requiring intimate knowledge of middleware specific data or programming styles or techniques, thus making software development that uses middleware more efficient.

Is to be understood that embodiments described herein include the generator 150 as a software application, or as part of another application, or as logic instructions and/or data encoded within a fixed or removable computer readable medium such as a floppy disk, hard disk or in an optical medium, or in a memory system such as in firmware, read only memory (ROM), or, as in the previous examples, as executable code within a memory system (e.g., within random access memory or RAM). It is also to be understood that other embodiments provide the generator 150 operating within a processor such as a central processing unit as a process. While not shown in this example, those skilled in the art will understand that a computer system can implement the generator and may include other processes and/or software and hardware components, such as an operating system, compiler, etc. Thus embodiments of the invention include the generator program existing as either code in unexecuted form on a computer readable medium (e.g., as a software program on a transportable medium such as a CDROM) or as an executing software process or as a computer system configured to operate as explained herein.

Other alternative arrangements of the invention include rearranging the processing steps explained above in such a way that the overall effect of the invention is the same or an equivalent. It is to be thus understood by those skilled in the art that the particular arrangement of processing steps in many instances does not specify implementation of embodiments. As such, those skilled in the art of software development and computer-related technologies will understand that there can be many ways and orders of representing the processing operations explained above and such alternative embodiments of the software code will still achieve the overall effects, features and advantages of the invention as explained herein. In addition, embodiments of the invention are not limited to operation on the computer systems shown above. The generator can operate on shared computing resources, or can be distributed among any number of computer systems. Furthermore, embodiments of the invention may operate to map application code to middleware for use in a storage area network management application. Thus a storage area network management application configured with authentication, timeout and target identity processing as explained herein is also considered an embodiment of the invention.

What is claimed is:

1. A computer-implemented method of categorical generation of component controllers, the computer-implemented method comprising:

receiving, as input, an identity of a component and identities of dependent components of the component;

applying a categorical-based generator that applies at least one morphism to generate at least one component controller to manage both collocated access and remote access to the dependent components of the component in a strongly typed manner, application of the categorical based generator including:

generating at least one service-component controller for controlling service components that are instantiated upon component server initialization to provide services to other components during component server operation;

generating at least one session-component controller for controlling session components instantiated, utilized for services during a session, and terminated as needed by other components;

wherein applying a categorical-based generator that applies at least one morphism to generate at least one component controller comprises:

creating the component controllers using factories declared in a coFactories interface associated with the component;

wherein the method comprises:

operating the component to manage interaction with its dependent components by using the at least one service component controller and the at least one session component controller in a coClass of the component;

operating the at least one component controller for at least one of the session component and the service component to expose an invoked component's coFriend in a strongly typed manner and to expose all the component's remotable interfaces in a strongly typed manner;

removing a specific interface, from a given component, causing the specific interface to disappear from a corresponding generated component controller; and identifying a given coClass as faulty at compile time in response to an attempt, via the given coClass, to access the specific interface through the corresponding generated component controller.

2. The computer-implemented method of claim 1 wherein generating at least one session-component controller comprises:
 creating a session-component controller by operating a controller factory that delegates to a component server's session component factory, the component server's session component factory:
  generating a new instance of a required version of the session component; and
  returning an arbitrary remotable interface of the new instance of a required version of the session component, if such an interface exists; and
  returning a coFriend of the session component's; and
 using the arbitrary remotable interface and the coFriend of the component to generate the session-component controller.

3. The computer-implemented method of claim 2, wherein applying a categorical-based generator that applies at least one morphism to generate at least one component controller comprises:
 providing a constructor, the constructor receiving a reference to an instance of the component and casting the reference to a coFriend interface and storing a coFriend as a member;
 providing a get coFriend method to return the coFriend in a strongly typed manner upon invocation;
 providing the constructor to receive at least one middleware-interface of the component;
 applying a session lookup inverse morphism to wrap the at least one middleware interface in a member bridge interface within a middleware-implementation object model;
 for each remotable interface supported by the component:
  i) providing a strongly typed getter for each remotable interface that returns an instance of a bridge interface by first applying a get interface method on the session lookup member to retrieve the bridge interface as a lookup-type interface; and
  ii) downcasting the bridge interface, of type Lookup, to obtain a required instance of a bridge interface;
 applying at least one morphism and at least one inverse morphisms in an implementations of a downcast operator and in a get interface method to achieve exposure in an interface model and to achieve strong typing through code generation; and
 defining the at least one service component controller by operating a naming service in place of a get interface method.

4. The computer-implemented method of claim 1 wherein generating at least one service-component controller comprises:
 operating a controller factory to query a naming service for a service component of the proper name and version, the naming service retrieving an arbitrary remotable interface of the service component, if such an interface exists, and retrieving a coFriend of the component; and
 using the arbitrary remotable interface and the coFriend of the component to generate the service-component controller.

5. The computer-implemented method of claim 1 wherein applying a categorical-based generator that applies at least one morphism to generate at least one component controller comprises:
 providing a constructor, the constructor receiving a reference to an instance of the component and casting the reference to a coFriend interface and storing a coFriend as a member;
 providing a get coFriend method to return the coFriend in a strongly typed manner upon invocation;
 providing the constructor to receive at least one middleware-interface of the component;
 applying a session lookup inverse morphism to wrap the at least one middleware interface in a member bridge interface within a middleware-implementation object model;
 for each remotable interface supported by the component:
  i) providing a strongly typed getter for each remotable interface that returns an instance of a bridge interface by first applying a get interface method on the session lookup member to retrieve the bridge interface as a lookup-type interface; and
  ii) downcasting the bridge interface, of type Lookup, to obtain a required instance of a bridge interface.

6. The computer-implemented method of claim 5 comprising:
 applying at least one morphism and at least one inverse morphisms in an implementations of a downcast operator and in a get interface method to achieve exposure in an interface model and to achieve strong typing through code generation; and
 defining the at least one service component controller by operating a naming service in place of a get interface method.

7. The computer-implemented method of claim 6, wherein applying a categorical-based generator that applies at least one morphism to generate at least one component controller comprises:
 creating the component controllers using factories declared in a coFactories interface associated with the component; and
wherein the computer-implemented method comprises:
 operating the component to manage interaction with its dependent components by using the at least one service component controller and the at least one session component controller in a coClass of the component;
wherein generating at least one session-component controller comprises:
 creating a session-component controller by operating a controller factory that delegates to a component server's session component factory, the component server's session component factory:
  generating a new instance of a required version of the session component; and
  returning an arbitrary remotable interface of the new instance of a required version of the session component, if such an interface exists; and
  returning a coFriend of the session component's; and
 using the arbitrary remotable interface and the coFriend of the component to generate the session-component controller;
wherein generating at least one service-component controller comprises:
 operating a controller factory to query a naming service for a service component of the proper name and version, the naming service retrieving an arbitrary remotable interface of the service component, if such an interface exists, and retrieving a coFriend of the component; and
 using the arbitrary remotable interface and the coFriend of the component to generate the service-component controller.

8. The computer-implemented method of claim 1 comprising:
operating the at least one service-component controller and the at least one session-component controller to provide strongly typed access to interfaces of components; and
operating the at least one service-component controller and the at least one session-component controller to provide transparent support of component versioning.

9. The computer-implemented method of claim 8, further comprising:
in response to upgrading the service component from a first version to a second version, transparently locating the second version of the component upon receiving a request for the first version; and
supporting old interfaces, from the first version, in the second version.

10. The computer-implemented method of claim 1, further comprising:
receiving, as input to the categorical-based generator, an object model specified in an Interface Description Language of a given middleware platform;
generating an abstraction of the object model that preserves the application semantics expressed in the Interface Description Language, abstraction of the object model concealing information related to the given middleware platform;
generating an implementation of the abstraction of the object model for a particular middleware object access mechanism, of the given middleware platform, used to access data within objects corresponding to the object model specified in the Interface Description Language.

11. A computer system comprising:
a memory;
a processor,
an interconnection mechanism coupling the memory and the processor;
wherein the memory is encoded with a generator that when executed on the processor provides categorical generation of component controllers by causing the computer system to perform the operations of:
receiving, as input, an identity of a component and identities of dependent components of the component;
applying a categorical-based generator that applies at least one morphism to generate at least one component controller to manage both collocated access and remote access to the dependent components of the component in a strongly typed manner, application of the categorical based generator including:
generating at least one service-component controller for controlling service components that are instantiated upon component server initialization to provide services to other components during component server operation;
generating at least one session-component controller for controlling session components instantiated, utilized for services during a session, and terminated as needed by other components;
wherein applying a categorical-based generator that applies at least one morphism to generate at least one component controller comprises:
creating the component controllers using factories declared in a coFactories interface associated with the component;
wherein the method comprises:
operating the component to manage interaction with its dependent components by using the at least one service component controller and the at least one session component controller in a coClass of the component;
operating the at least one component controller for at least one of the session component and the service component to expose an invoked component's coFriend in a strongly typed manner and to expose all the component's remotable interfaces in a strongly typed manner;
removing a specific interface, from a given component, causing the specific interface to disappear from a corresponding generated component controller; and
identifying a given coClass as faulty at compile time in response to an attempt, via the given coClass, to access the specific interface through the corresponding generated component controller.

12. The computer system of claim 11 wherein the computer operation of generating at least one session-component controller comprises:
creating a session-component controller by operating a controller factory that delegates to a component server's session component factory, the component server's session component factory:
generating a new instance of a required version of the session component; and
returning an arbitrary remotable interface of the new instance of a required version of the session component, if such an interface exists; and
returning a coFriend of the session component; and
using the arbitrary remotable interface and the coFriend of the component to generate the session-component controller.

13. The computer system of claim 11 wherein the computer operation of generating at least one service-component controller comprises:
operating a controller factory to query a naming service for a service component of the proper name and version, the naming service retrieving an arbitrary remotable interface of the service component, if such an interface exists, and retrieving a coFriend of the component; and
using the arbitrary remoteble interface and the coFriend of the component to generate the service-component controller.

14. The computer system of claim 11 wherein the computer operation of applying a categorical-based generator that applies at least one morphism to generate at least one component controller comprises:
providing a constructor, the constructor receiving a reference to an instance of the component and casting the reference to a coFriend interface and storing a coFriend as a member;
providing a get coFriend method to return the coFriend in a strongly typed manner upon invocation;
wherein the computer operation comprises:
providing the constructor to receive at least one middleware-interface of the component;
applying a session lookup inverse morphism to wrap the at least one middleware interface in a member bridge interface within a middleware-implementation object model;
for each remotable interface supported by the component:
i) providing a strongly typed getter for each remotable interface that returns an instance of a bridge interface by first applying a get interface method on the session lookup member to retrieve the bridge interface as a lookup-type interface; and
ii) downcasting the bridge interface, of type Lookup, to obtain a required instance of a bridge interface;
applying at least one morphism and at least one inverse morphisms in an implementations of a downcast operator and in a get interface method to achieve exposure in an interface model and to achieve strong typing through code generation; and defining the at least one service component controller by operating a naming service in place of a get interface method.

15. The computer system of claim 11 wherein the computer operation of comprises:

operating the at least one service-component controller and the at least one session-component controller to provide strongly typed access to interfaces of components; and operating the at least one service-component controller and the at least one session-component controller to provide transparent support of component versioning.

16. A computer readable storage medium including computer program logic encoded thereon that, when executed on a computer system, provides a code generator that causes the computer system to generate component controllers by causing the computer system to perform operations of:

receiving, as input, an identity of a component and identities of dependent components of the component;

applying a categorical-based generator that applies at least one morphism to generate at least one component controller to manage both collocated access and remote access to the dependent components of the component in a strongly typed manner, application of the categorical based generator including:

generating at least one service-component controller for controlling service components that are instantiated upon component server initialization to provide services to other components during component server operation;

generating at least one session-component controller for controlling session components instantiated, utilized for services during a session, and terminated as needed by other components;

wherein applying a categorical-based generator that applies at least one morphism to generate at least one component controller comprises:

creating the component controllers using factories declared in a coFactories interface associated with the component;

wherein the method comprises:

operating the component to manage interaction with its dependent components by using the at least one service component controller and the at least one session component controller in a coClass of the component;

operating the at least one component controller for at least one of the session component and the service component to expose an invoked component's coFriend in a strongly typed manner and to expose all the component's remotable interfaces in a strongly typed manner;

removing a specific interface, from a given component, causing the specific interface to disappear from a corresponding generated component controller; and identifying a given coClass as faulty at compile time in response to an attempt, via the given coClass, to access the specific interface through the corresponding generated component controller.

* * * * *